July 7, 1925.
H. A. SCHMIDT
TILTING DEVICE FOR VEHICLE BODIES
Filed April 30, 1923
1,544,942
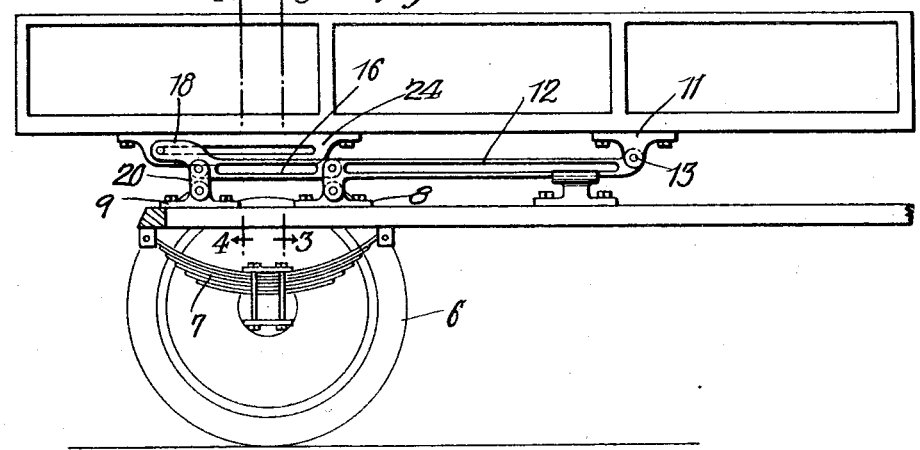
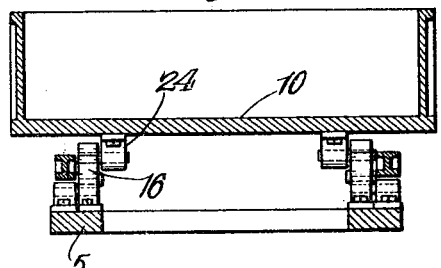
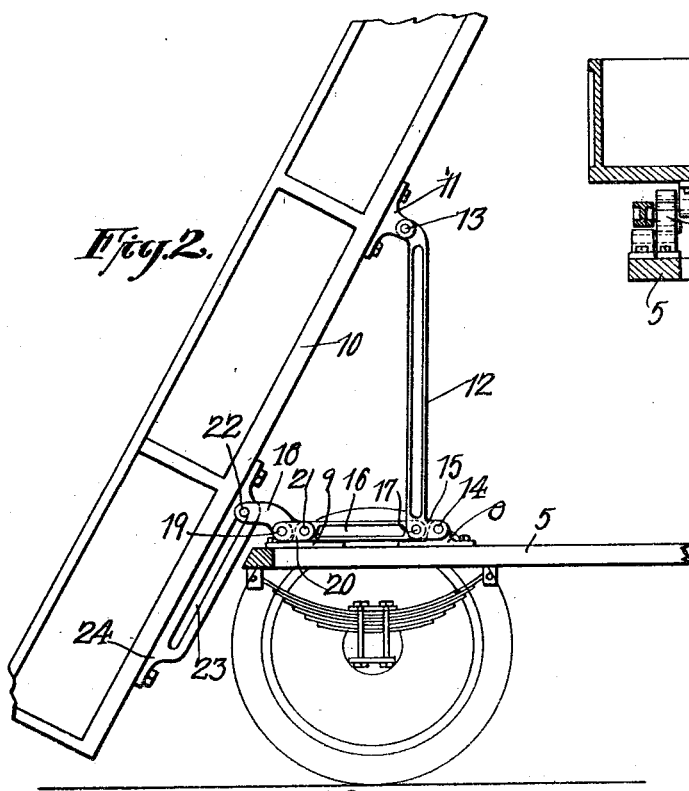
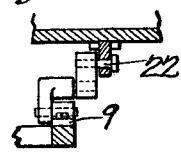
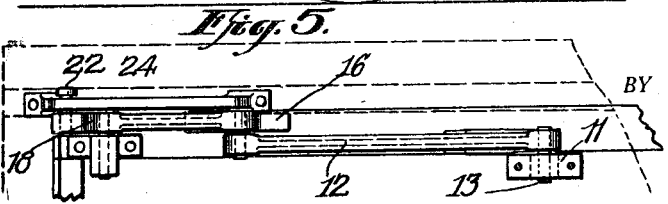
INVENTOR.
Henry A. Schmidt.
BY
Richard B. Owens
ATTORNEY.

Patented July 7, 1925.

1,544,942

UNITED STATES PATENT OFFICE.

HENRY A. SCHMIDT, OF LONG ISLAND CITY, NEW YORK.

TILTING DEVICE FOR VEHICLE BODIES.

Application filed April 30, 1923. Serial No. 635,728.

*To all whom it may concern:*

Be it known that I, HENRY A. SCHMIDT, a citizen of the United States, residing at Long Island City, in the county of Queens and State of New York, have invented certain new and useful Improvements in Tilting Devices for Vehicle Bodies, of which the following is a specification.

This invention relates to tilting or dumping devices for motor vehicle trucks and the like and more particularly to a novel and improved construction permitting a vehicle body to be raised from the chassis and maintain its balance while the said body is being raised.

One of the objects of my invention is to provide a tilting or dumping arrangement connecting the chassis with the body of a motor vehicle truck, for instance wherein the latter may be raised and tilted at a very sharp angle with respect to the chassis and the rear end of the body drop below and in back of the said chassis so that the contents of the said body may be easily dumped therefrom.

An equally and important object of my invention is to provide a listing and sliding connection between the chassis and main of a motor vehicle whereby as the body is raised and angles with respect to the chassis, its contents may be dumped rearwardly thereof and the rear end of the body dropped below and behind the chassis of the vehicle when the body has been raised to its maximum position.

I accomplish the above objects and others which will be more readily understood when taken in connection with the accompanying drawings, showing a preferred embodiment of my invention and wherein:

Figure 1 is a side view showing the attachment in position with respect to the chassis and body of a vehicle.

Figure 2 is a similar view showing the vehicle body raised to its maximum position.

Figure 3 is a sectional view taken on the line 3—3 of Figure 1.

Figure 4 is a further sectional view taken substantially on the line 4—4 of Figure 1.

Figure 5 is a plan view of the connection between the chassis and the vehicle body.

Referring now to the drawings wherein like reference characters designate corresponding parts throughout the several views, 5 designates the chassis of a motor vehicle and 6 the rear supporting wheel, mounted on the usual axle and further provided with springs 7 bolted or secured to said axle in any well known manner, which construction is common to various types of constructions. On the chassis 5, I have provided opposed, relatively spaced bearing brackets 8, 9, which support the connection to the body, designated in its entirety by numeral 10. A bracket 11 secured to the bottom of the body 10 and equally spaced from the sides thereof, is connected to the bearing bracket 8 by an L-shaped rod 12, the latter being pivotally connected as at 13 to the bearing bracket 11 and pivoted as at 14 to the bearing bracket 8 above referred to. It will thus be seen that the extension or bent end 15 of the L-shaped connecting rod 12 may move in an arc of a circle or in other words, 90 degrees permitting the connecting rod 12 to be raised vertically and consequently tilt the body in the manner shown.

Pivotally connected to the lower end of the rod 12 and at the juncture of the bent portion 15, I have provided a second connecting arm 16, shorter in length than the first mentioned connecting rod and pivotally connected thereto as indicated at 17. Consequently, any movement imparted to the rod 12 will effect and actuate the arm 16 in raising or lowering the body 10 in the manner now to be further described.

The opposite end of the connecting arm 16 is further provided with a head 18, pivotally connected at 19 to the link 20, said link being of course pivotally connected at 21 to the rear bearing bracket 9, disposed adjacent the rear end of the chassis 5 as shown. The link 20 is also mounted for movement in the arc of a circle to the same extent as the extension 15, or in other words, a 90 degree arc, it being further noted that the link is disposed on the inside of the bracket 9 and the head 18 on the outside thereof.

Referring to Figures 1 and 2 of the drawing, in particular, it will be observed that the head 18 is provided with a stud 22 that extends within the slot 23 of the guide bracket 24, bolted to the bottom of the body 10 and limiting the angular movement of said body when the same is raised and tilted.

From the above construction, it will be readily understood by those skilled in the art that when the connecting rod 12 is raised, that sliding movement will be imparted to the second connecting arm 16 so as to move the same inwardly and consequently, the stud 22 will begin to slide in the guide brackets 24 until the limit of its movement is reached and the body disposed at the maximum angle with respect to the chassis of the motor vehicle and effectively dump the contents of the body rearwardly of the machine. Of course any suitable raising and lowering mechanism may be utilized in a vehicle body of this character and will not in any way affect the operation of the connecting elements between the chassis and the said body.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. The combination of a chassis and body, bearings secured to the said chassis and body, connecting rods pivotally connected to the bearings and movable at right angles with respect to the chassis, arms pivotally connected to the ends of the connecting rods and normally lying in longitudinal alignment therewith, and guide brackets attached to the body for loosely receiving the opposite ends of the arms and constituting a stop limiting means when the rear end of the body is tilted below the chassis.

2. The combination of a chassis and body, bearings secured to the said chassis and body, L-shaped connecting rods pivotally connected to the bearings and movable at right angles to the chassis, arms pivotally connected to the lower ends of the connecting rods and normally in longitudinal alignment therewith, slotted bearing brackets attached beneath the body and means loosely connecting the opposite ends of the arms with the said brackets permitting the tilting movement of the body, said brackets constituting a stop or limiting means for said body when the rear end thereof is tilted rearwardly of and below the chassis.

In testimony whereof I affix my signature in presence of two witnesses.

HENRY A. SCHMIDT. [L. S.]

Witnesses:
KARL CHRISTOFFERS,
FREELAND J. ELLIS.